April 28, 1964   H. M. KENNEDY   3,130,605
SPEED REDUCTION GEAR BOX
Filed Aug. 3, 1961   6 Sheets-Sheet 5

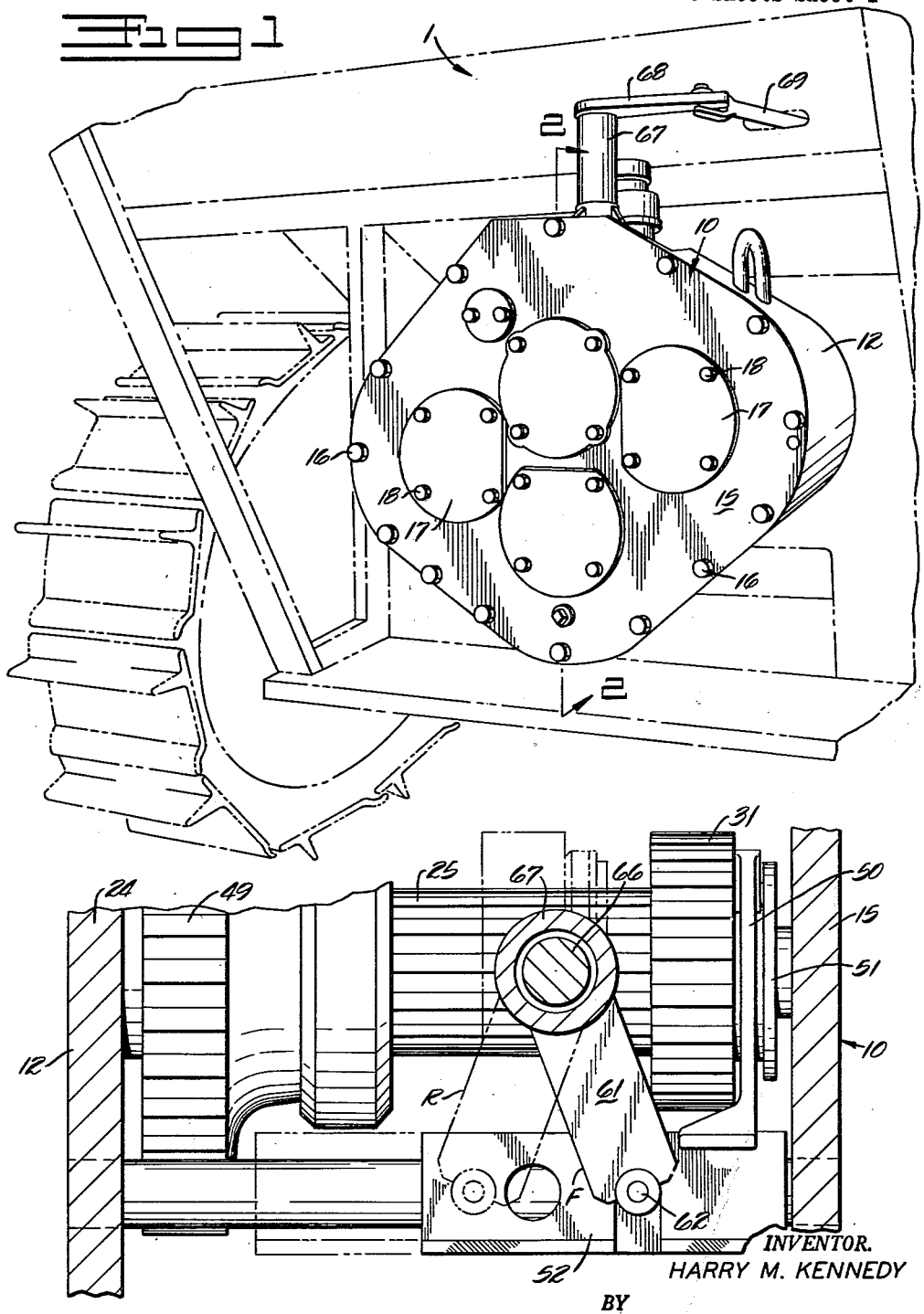

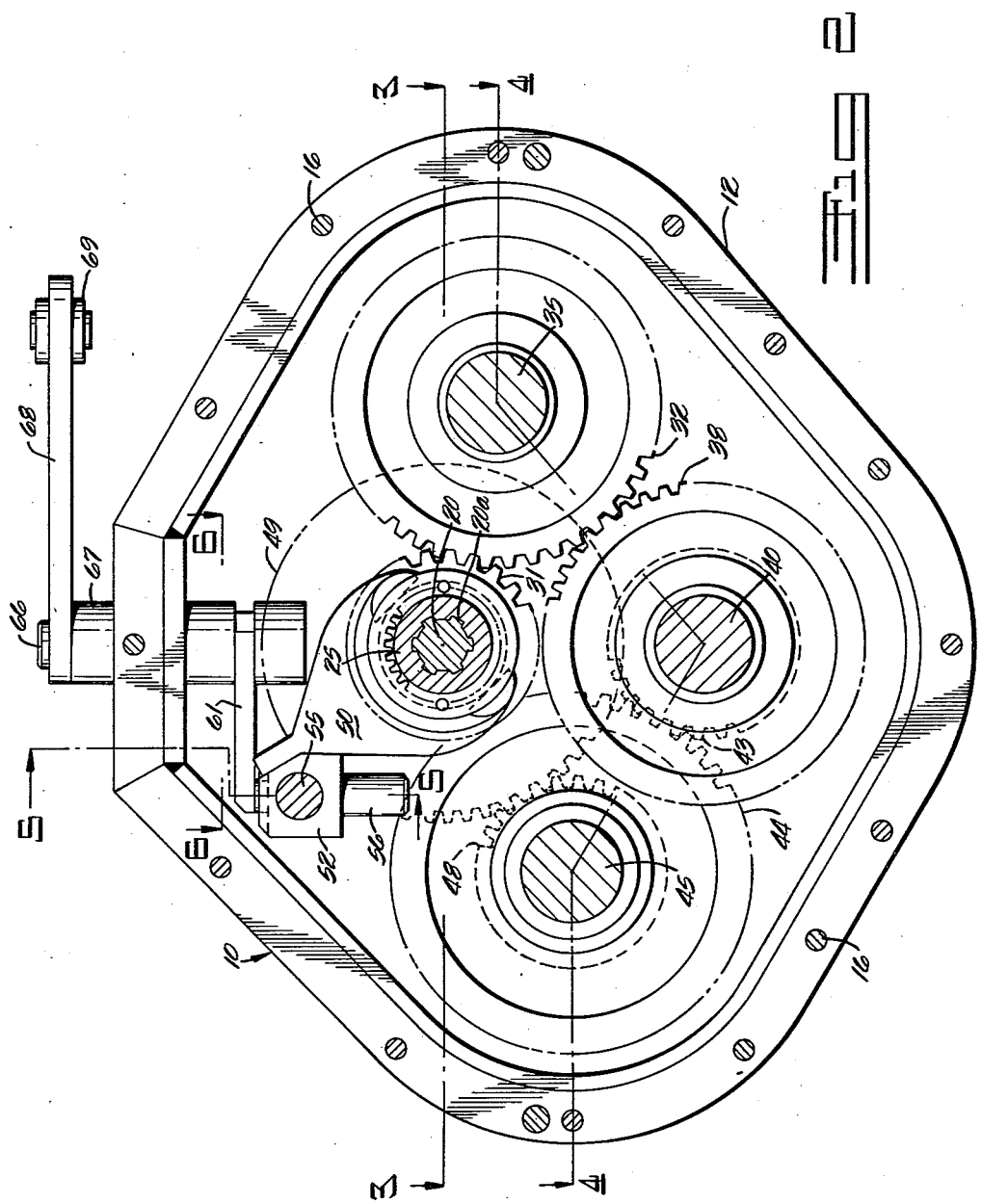

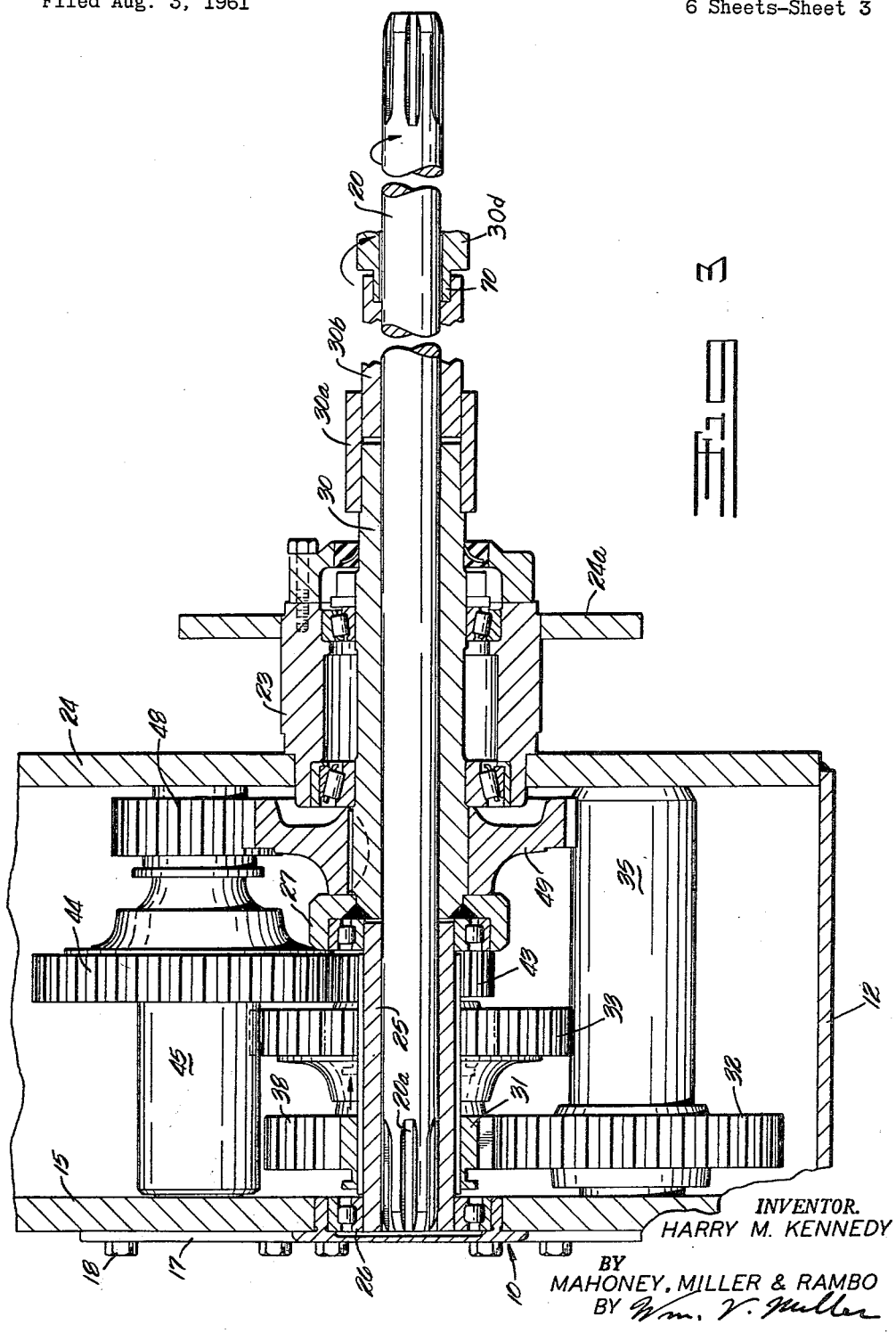

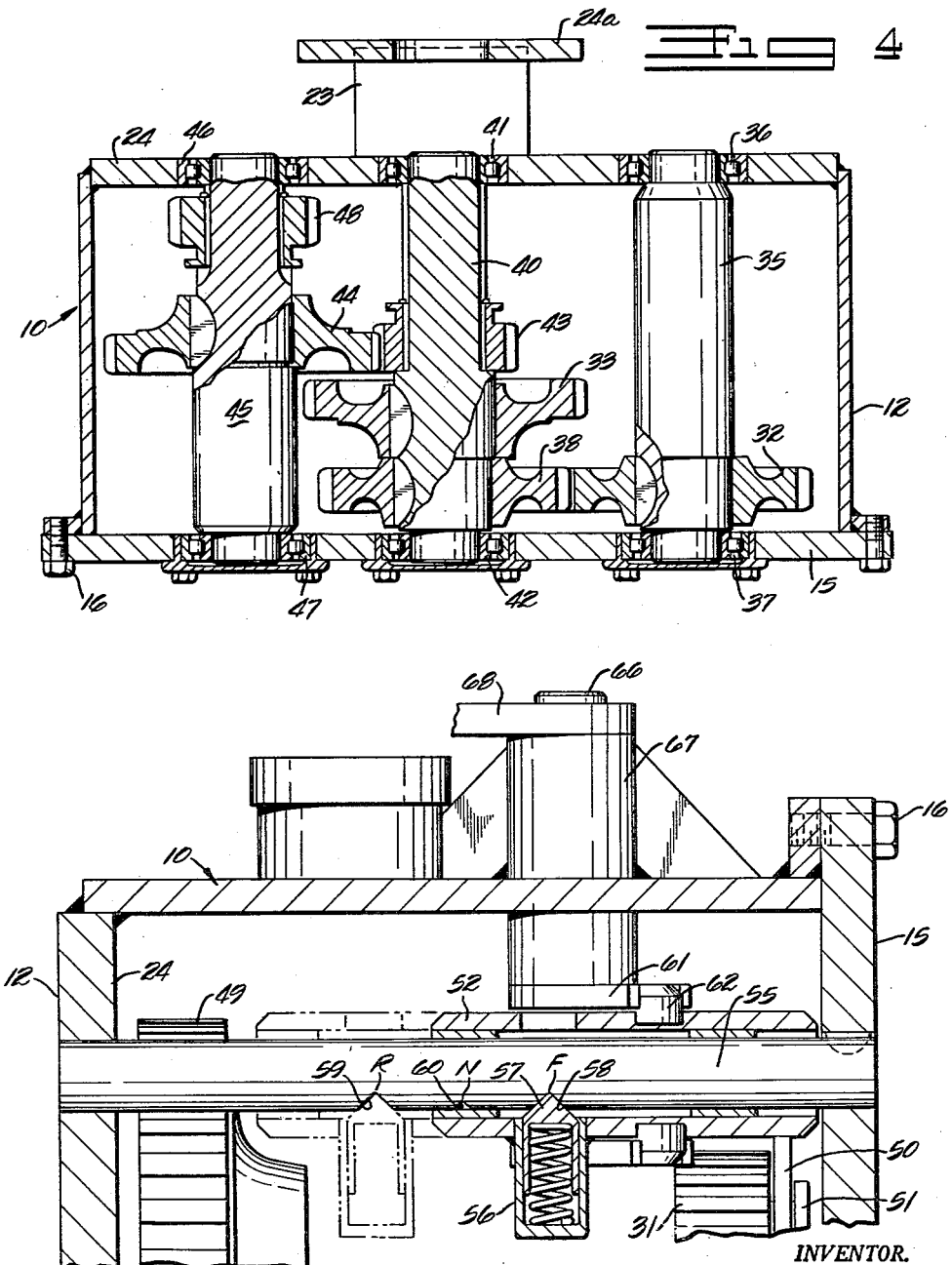

INVENTOR.
HARRY M. KENNEDY
BY MAHONEY, MILLER & RAMBO
BY Wm. V. Miller
ATTORNEYS.

April 28, 1964     H. M. KENNEDY     3,130,605
SPEED REDUCTION GEAR BOX
Filed Aug. 3, 1961     6 Sheets-Sheet 6
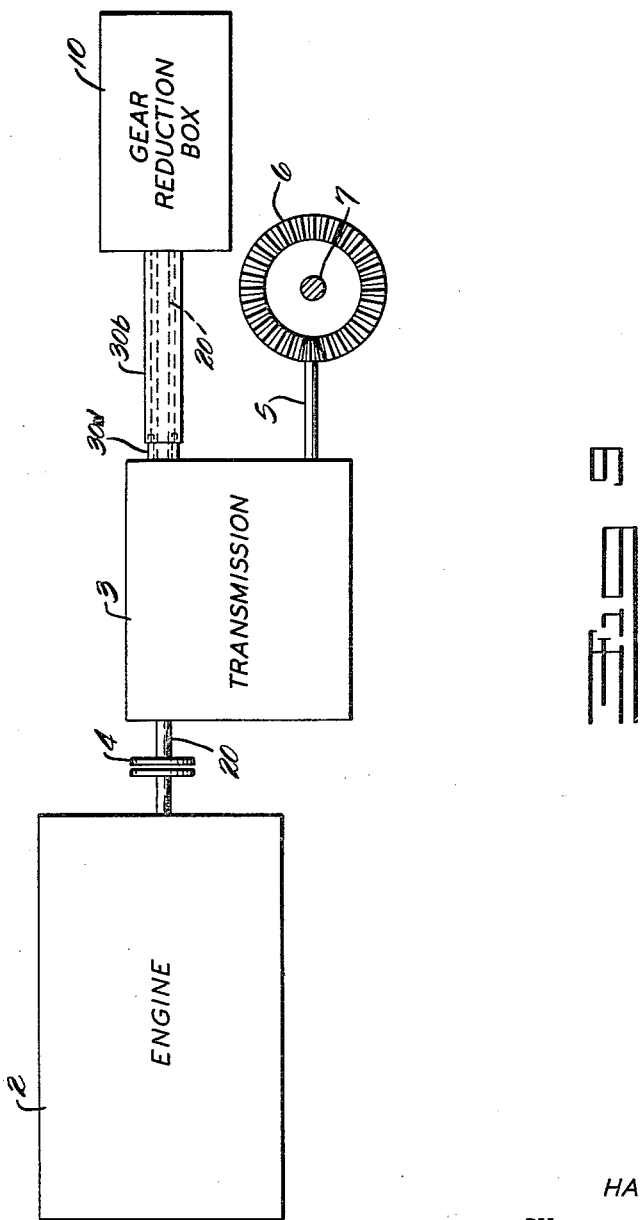
INVENTOR.
HARRY M. KENNEDY
BY
MAHONEY, MILLER & RAMBO
BY
ATTORNEYS.

3,130,605
SPEED REDUCTION GEAR BOX
Harry M. Kennedy, Bucyrus, Ohio, assignor to The Superior Equipment Company, Bucyrus, Ohio, a corporation of Ohio
Filed Aug. 3, 1961, Ser. No. 129,076
5 Claims. (Cl. 74—745)

My invention relates to a speed reduction gear box. It has to do, more particularly, with a speed reduction gear box or unit which can be applied to a standard tractor to permit, in combination with the usual transmission thereof, reduction of the traveling speed of the tractor in a forward or reverse direction to various slow or creeping speeds.

The gear box of this invention was developed for use on a standard tractor of the crawler type, although it is not limited thereto. In the particular application for which this gear box was developed, the tractor carried a backfiller attachment extending from one side thereof which was used to return dirt or other material to a ditch from which it had been removed by various ditching or earth moving tools. Obviously, during such a backfilling operation, it is desirable that the tractor travel at very low speeds. Available tractors on the market had minimum speeds of 1.5 m.p.h. whereas for this backfilling operation lower speeds were desirable. Lower tractor speeds were essential for the backfilling operation if the tractor was to keep in motion while backfilling and still permit material-moving bucket overlap on consecutive cycles. Therefore, the present gear box was developed for permitting speeds as low as 0.37 m.p.h. up to 1.45 m.p.h. Furthermore, the gear box was so designed that it could be readily attached to the multi-speed transmission of a standard tractor of the crawler type with a minimum of structural changes.

To accomplish the reduced speeds with the gear box of my invention, the power is transmitted from the tractor transmission to the gear reduction box through an input or power shaft, and in the gear box through gear combinations the speed is reduced and the drive is returned to the tractor transmission through an output power shaft of the quill type which surrounds the input power shaft. For reverse motion the tractor reversing mechanism is not used and the master clutch of the tractor is released and by choice of optional gears in the gear box through a reverse shifting mechanism, the output shaft will be revolved in an opposite or reverse direction upon reengagement of the master clutch of the tractor.

The preferred embodiment of my speed reduction gear box is illustrated in the accompanying drawings in which:

FIGURE 1 is a perspective view of the gear box and showing schematically how it is applied to the rear end of a tractor of the crawler type.

FIGURE 2 is an enlarged vertical sectional view through the gear box taken along line 2—2 of FIGURE 1.

FIGURE 3 is a horizontal sectional view through the gear box taken along line 3—3 of FIGURE 2.

FIGURE 4 is a similar view taken along line 4—4 of FIGURE 2.

FIGURE 5 is an enlarged vertical sectional view taken along line 5—5 of FIGURE 2.

FIGURE 6 is an enlarged horizontal sectional view taken along line 6—6 of FIGURE 2 showing the reversing shifting mechanism.

FIGURE 9 is a schematic view illustrating how the gear box is connected to the tractor transmission.

Figure 7:
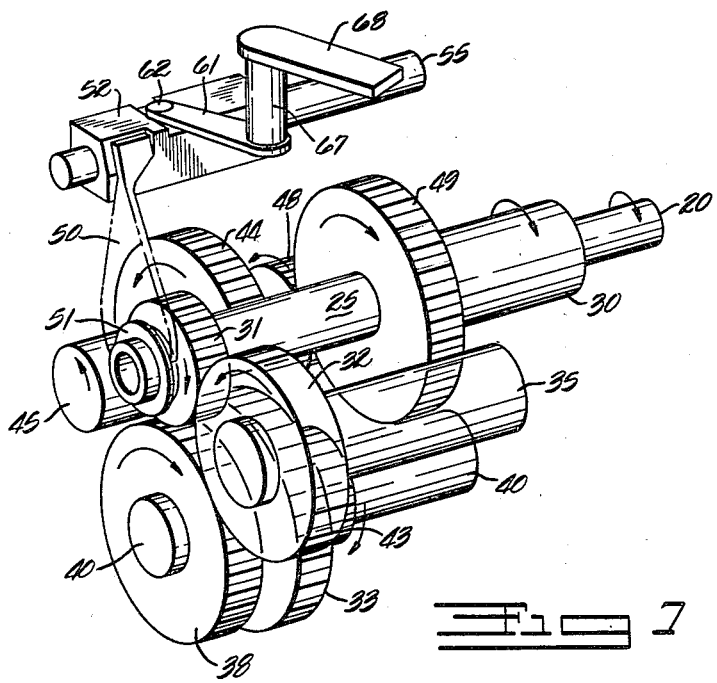
FIGURE 7 is a schematic perspective view illustrating the control and operation of the gear box with the shifting mechanism set for forward drive of the output shaft.

With reference to the drawings, the gear reduction box of this invention is designated generally by the numeral 10 and is shown mounted at the rear of a tractor designated generally by the numeral 1. The tractor is indicated as being of the crawler type although my invention is not limited to that particular application. As shown in FIGURE 9, schematically, the engine 2 of the tractor drives the multi-speed transmission 3 through the master clutch 4. The clutch 4 is of the usual type and the transmission 3 is also of the usual type having various gear trains which can be selected for various speeds. The output shaft 5 of the transmission drives the differential gears 6 of the tractor which are associated with the drive axle 7 for the traction or propelling means of the tractor.

The gear reduction box 10 comprises a main housing 12 (FIGURE 1) of suitable outline which is closed at its rear side by means of a removable cover plate 15 bolted thereto by the removable bolts 16. Other smaller removable plates 17 are disposed over conveniently located access openings in the plate 15 and are bolted to the plate 15 by removable bolts 18. An input shaft 20 extends rearwardly from the tractor transmission 3 through the output shaft 30 (FIGURE 3) of the gear box which is of the quill or hollow sleeve type. The forward end of the shaft 30 is coupled by a coupling 30a to the shaft extension 30b and the forward end of this shaft extension 30b is connected to the transmission 3. The shaft 20 rotates within the surrounding shaft 30 and the extension 30b thereof.

The output or driven shaft 30 is rotatably carried by a roller bearing and seal unit 23 which is mounted in the forward plate 24 of the housing 12 and in a parallel plate or support 24a both of which are secured to the tractor frame. The input or drive shaft 20 extends rearwardly to a point adjacent the cover plate 15 and its rear portion is surrounded by a hollow sleeve 25 which is keyed thereto at the multiple key 20a. The sleeve 25 has its rear end rotatably supported in a roller bearing 26 carried by thte cover plate 15 and its forward end rotatably supported in a roller bearing 27 carried by the adjacent aligned rear end of the shaft 30. Thus, the sleeve 25 is rotatable with the shaft 20 but relative to the shaft 30.

The sleeve 25 may be termed a spline sleeve and carries on its exterior surface multiple splines for splining thereto an axially shiftable gear 31. Thus, the gear 31 can be shifted axially of the sleeve 25. This shiftable gear 31 is adapted to selectively engage with either of the gears 32 or 33 which are axially spaced relative to the sleeve 25. The gear 32 is keyed on a reverse shaft 35 which is disposed parallel to the axis of the sleeve 25. This shaft 35 (FIGURE 4) has its forward end mounted in a roller bearing 36 in the housing plate 24 and its rear end mounted in a roller bearing 37 in the cover plate 15. The gear 32 meshes with a gear 38 which is keyed on a jack shaft 40. The gear 38 is keyed to the rear end of the shaft 40 and the gear 33 is also keyed thereto just ahead of the gear 38. The shaft 40 is carried at its forward end in a roller bearing 41 on the housing plate 24 and its rear end in a bearing 42 on the cover plate 15. The jack shaft 40 also has keyed thereto a pinion or gear 43 directly ahead of the gear 33. This gear 43 meshes constantly with a gear 44 which is carried by an intermediate shaft 45 which is parallel to the shaft 40 at the side thereof opposite to the side where the shaft 35 is disposed. The shaft 45 is carried in parallel relationship with the shaft 40 and is rotatably supported at its forward and rearward ends by the roller bearings 46 and 47, respectively, carried in the respective plates 24 and 15. Forwardly of the gear 44 on the shaft 45 is a gear 48 (FIGURES 3 and 4) which is keyed thereto. This gear 48 is in constant mesh with a gear 49 which is keyed on the output shaft 30 between the roller bearings 23 and 27.

With the gear 31 in engagement with the gear 32, the drive of the output shaft or quill 30 will be in a forward direction as shown in FIGURE 7 and as indicated by the arrows therein. The reverse gear of the tractor transmission will not be used when the gear box 10 is used to obtain the creeping speed so that the shaft 20 will always turn in the same direction when driving the unit 10, the direction being clockwise as viewed from the rear of the unit. The output shaft or quill 30 will be driven in that same direction with the shiftable gear 31 in selective engagement with the gear 32 as shown in FIGURE 7. The sleeve 25 is driven at all times in a clockwise direction by the shaft 20 and, consequently, the gear 31 is driven clockwise at all times. The gear 32 is driven counterclockwise by the gear 31 when meshing therewith and will drive the gear 38 and the shaft 40 clockwise. Since the gear 43 is carried by the shaft 40 it also will be driven clockwise and it will drive the meshing gear 44 and the shaft 45, which carries it, counterclockwise. The gear 48 carried by the shaft 45 is also driven counterclockwise and will drive the gear 49, meshing therewith, clockwise. Since the shaft 30 has the gear 49 keyed thereto it will also be driven in a clockwise direction which will be the direction for propelling the tractor forward.

Figure 8:
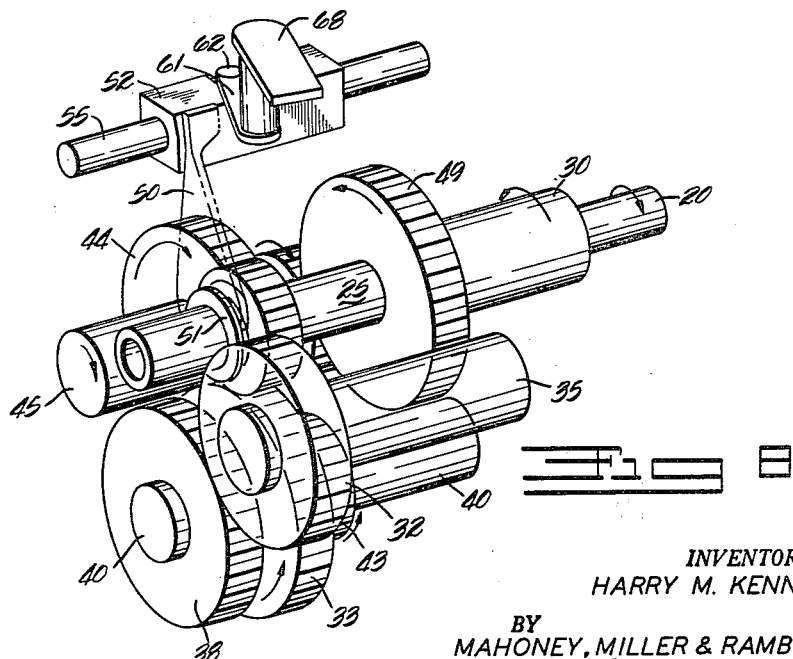
FIGURE 8 is a similar view but showing the shifting mechanism set for reverse drive of the output shaft.

If the gear 31 is shifted as indicated in FIGURE 8, the shaft 30 will be driven in a reverse direction. The gear 31 at this time will be out of mesh with the gear 32 and in mesh with the gear 33. Thus, the reversing drive will not be through the shaft 35 but will be directly to the shaft 40 through the gear 33. The gear 33 and the shaft 40 will be driven counterclockwise by the gear 31 and this will drive the gear 44 and shaft 45 clockwise. Gear 48 will, therefore, be driven clockwise which will, in turn, drive the gear 49 counterclockwise. The result will be that the output shaft 30 will be driven in a counterclockwise direction which will be the proper direction for propelling the tractor in a reverse direction.

For shifting the gear 31 to its axially spaced positions for forward or reverse drive, the shifting lever arrangement shown in the drawings is preferably provided. This arrangement includes a fork or yoke 50 which has its lower end embracing the hub 51 of the gear 31 and positioned in an annular groove therein so that the gear can rotate but the member 50 can be used to move it axially of the sleeve 25. The upper end of the yoke 50 is rigidly connected to a slide bearing block 52 which is mounted for sliding movement on a rod 55 which is positioned parallel with the shaft 25. The rod 55 is fixed in the housing plates 15 and 24 (FIGURE 5). Radially disposed of the rod 55 and carried by the block 52 is a spring-pressed plunger or latch 56 which has a pointed latch 57 that cooperates with two identical larger end sockets 58 and 59 and an intermediate socket 60 formed at longitudinally spaced intervals in the surface of the rod 55. The sockets 58, 59, and 60 determine the position of the yoke 50 to selectively position the gear 31 in forward, neutral, or reverse position, respectively. The member 52 is shifted axially of the rod 55 by means of a crank arm 61 which is pivoted thereto at a vertical pivot 62 and which swings about the vertical axis of a pin 66 which is rotatably mounted in a bearing sleeve 67 extending through the upper wall of the housing 12. The crank 61 is non-rotatably connected to the pin 66 and the upper end of the pin is rigidly connected to an actuating arm 68 which may be actuated by suitable linkage 69 extending forwardly to a suitable location adjacent the operator's position on the tractor. Thus, the gear box may be selectively actuated easily by the operator for forward, neutral, or reverse condition.

With this gear box, a creeping speed forward or rearward for the tractor can be obtained. This will be apparent from the diagram illustrated in FIGURE 9 which illustrates how the gear box 10 is connected to the transmission 3. The shaft 20 is a power shaft driven by the engine 2 through the master clutch 4 and may serve as the input drive shaft for the transmission. This power shaft 20 is also surrounded by the relatively rotatable hollow shaft 30d of the transmission which is the usual spline shaft of the transmission having shiftable gears mounted thereon (not shown) to obtain the various speeds of the output shaft 5. The forward end of the extension 30b of the output shaft 30 of the gear box 10 is splined to the transmission shaft 30d in the manner illustrated schematically in FIGURE 9 and more in detail in FIGURE 3. The forward end of the shaft 30d is provided with an extension 70 which is splined in a socket in the rear end of the gear box shaft extension 30b. The gear box input shaft 20 may be merely a coupled extension of the transmission input shaft instead of the same shaft.

Thus, as long as the clutch 4 is engaged, the shaft 20 is driven and will drive the gear box unit 10, which will drive the output shaft 30 at a much reduced speed. This shaft 30 of the gear box, being coupled to the transmission shaft 30d, will drive it and this shaft 30d, being coupled to the output shaft 5 by a selected gear train, will drive that output shaft and move the tractor at a selected speed. Reversing is obtained by use of the gear box 10 and the reverse gear in the tractor transmission 3 is not used. The master clutch 4 is released and the gear box control is actuated to set it in reverse position after which the master clutch 4 is again engaged. The neutral position for the gear box 10 is provided so that the gear box can be rendered ineffective and the tractor transmission 3 can be used in the usual manner.

Having thus described my invention, what I claim is:

1. In a gear box for obtaining a low-speed, an input shaft, a hollow output shaft surrounding said input shaft, said input shaft extending from both ends of the hollow shaft, a sleeve coaxial with the output shaft and keyed on one end of the input shaft, a shiftable gear splined on said sleeve for axial movement, two trains of gears between said sleeve and said output shaft for forward and reverse drive thereof respectively, and means for moving said shiftable gear along said sleeve to select either the forward train or the reverse train of gears.

2. In a gear box for obtaining a low speed, an input drive shaft, a hollow output driven shaft surrounding said input shaft, said input shaft extending from both ends of the hollow shaft, a sleeve coaxial with one end of the output shaft and keyed to the adjacent end of the input shaft extending from the hollow output shaft, a shiftable gear mounted on the exterior of said sleeve and shiftable axially thereof, a jack shaft parallel with said sleeve and carrying two axially spaced gears keyed thereto, a reverse shaft between said sleeve and said jack shaft and parallel thereto, a gear carried by the reverse shaft and meshing with one of the gears on the jack shaft, said gear on the reverse shaft and the other gear on the jack shaft being axially spaced and being selectively engageable by said shiftable gear, said jack shaft having another gear keyed thereon and geared to said output shaft.

3. The combination of claim 2 in which the last-named gear meshes with a gear keyed on an intermediate shaft, said intermediate shaft being parallel with said output shaft and coaxial sleeve and said jack shaft but being on the side of the sleeve opposite to the position of the jack shaft, said intermediate shaft having another gear keyed thereto which meshes with a gear keyed on said output shaft.

4. In combination, a transmission, a drive shaft connected to an engine through a clutch and extending into and from the transmission, said transmission having an output shaft, said transmission also having a relatively rotatable hollow shaft surrounding the drive shaft and connectable to the output shaft thereof, a gear box connected between said drive shaft and said transmission hollow shaft, said gear box having said drive shaft serving also as its input shaft and having an output shaft, said gear box input shaft being positioned in and surrounded by said gear box output shaft which is hollow and being relatively rotatable, and gearing between said gear box input shaft and said gear box output shaft for driving said output shaft from said input shaft, said gear box output shaft being coaxial with and coupled to said transmission hollow shaft.

5. In the combination of claim 4, a vehicle having traction means and said vehicle carrying said engine, clutch, transmission and gear box, said output shaft of the transmission being connected to and driving said traction means.

References Cited in the file of this patent

UNITED STATES PATENTS 2,810,293    George et al. _____ Oct. 22, 1957
2,975,656    Haverlender _____ Mar. 21, 1961

OTHER REFERENCES

Corvair Shop Manual, 2nd edition, 1959, page 6 D–2, FIGURE 6D–1.